April 23, 1940.                H. INGRAM                  2,198,366
            VENTING CLOSURE FOR JARS, CANS, AND OTHER RECEPTACLES
                            Filed June 4, 1937
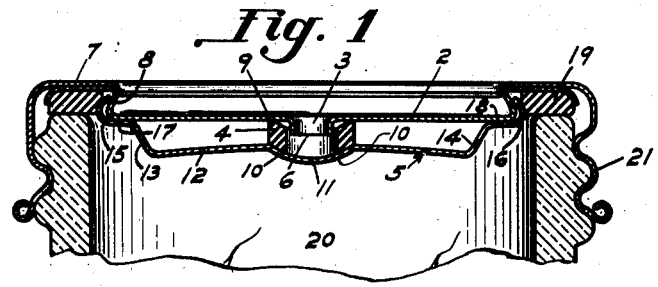
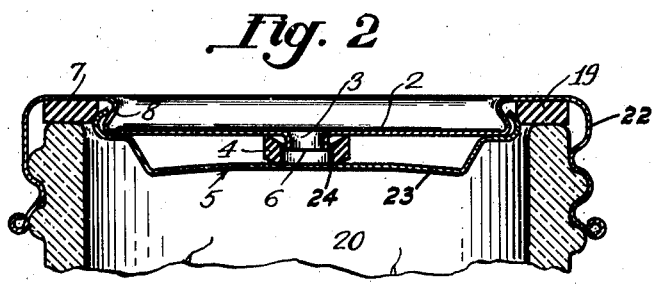
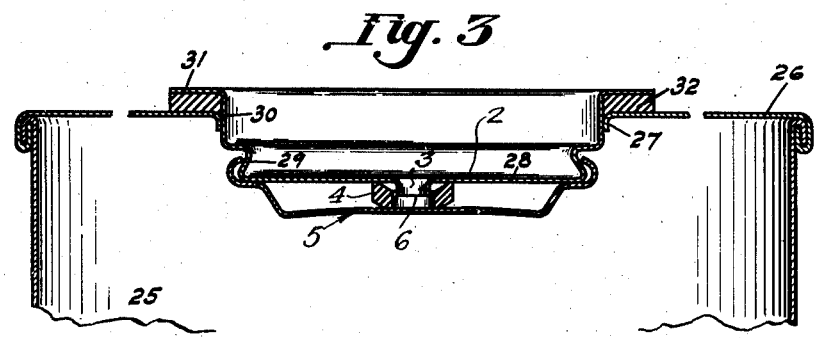

Patented Apr. 23, 1940

2,198,366

UNITED STATES PATENT OFFICE 2,198,366

VENTING CLOSURE FOR JARS, CANS, AND OTHER RECEPTACLES

Harry Ingram, Wheeling, W. Va.

Application June 4, 1937, Serial No. 146,394

4 Claims. (Cl. 215—56)

This application is a continuation in part of my copending application entitled "Closure for jars and other receptacles," filed November 19, 1934, Serial No. 753,775.

My invention relates to venting closures for receptacles, and more particularly to such closures including a diaphragm valve for controlling the venting action. In this respect, my invention contemplates the same general elements as those disclosed in my prior Patent No. 1,576,763, namely, a diaphragm with a vent orifice therein, a valve gasket and a gasket support. My present invention is an improvement over the device of my prior patent and the distinguishing features thereof will be apparent to those skilled in the art, and certain characterizing elements and combinations will be specifically described to enable a clear, readily understandable perception of my present invention.

The invention is illustrated in the attached drawing in which:

Figure 1 is a sectional view showing a venting closure of the type contemplated, placed on a glass jar;

Figure 2 is a similar view of a modification in which the diaphragm is unitary with the closure attaching means; and Figure 3 is a sectional view illustrating another modification with the closure applied to a conventional type of tin can.

The closure of my invention comprises essentially a flexible metallic diaphragm 2 which forms the top or head portion of the closure. The diaphragm 2 is provided with a vent orifice 3 which is adapted to be sealed by a valve gasket 4. A gasket support 5 is provided which is secured to the closure, being so disposed as to lie a predetermined distance from the diaphragm when the diaphragm is in its normal position. The diaphragm, gasket and gasket support are frictionally joined into a unitary structure.

In the embodiment of Figure 1, the diaphragm 2 is circular in plan and is provided with a central orifice 3 defined by a depending eyelet 6 which serves to maintain the gasket 4 in proper position with respect to the diaphragm 2. The diaphragm 2 is circumscribed by a flange 7 which lies in a plane above but parallel to the plane of the diaphragm 2. The flange 7 and the diaphragm 2 are joined by an integral, angularly disposed connecting skirt 8 which is directed generally inwardly and downwardly from the flange 7 and intersects the diaphragm 2 to form a substantially U-shaped cross section at the line of joining.

The channel-shaped annular portion confines all deforming pressure and straining stress incident to the use of the closure to portions other than the diaphragm 2 and any predetermined characteristics of the diaphragm 2 are maintained regardless of the container to which the closure is applied or the manner of application. This is important where highly flexible diaphragms are utilized to provide a maximum degree of evacuation.

The gasket 4 is preferably in the form of a hollow cylinder having chamfered edges 9 and 10, the edge or fin 9 lying in engagement with the under side of the diaphragm 2 along a line circumscribing the vent opening 3 and the edge 10 being disposed within a concavity 11 provided in the support 5. Engagement of the portions 9 and 10 with the respective surfaces of the diaphragm 2 and support 5 serves to seal the vent orifice. In most instances, it will be desirable to so proportion the various elements that the orifice will be normally sealed by the inherent tendency of the diaphragm to move toward the gasket support, thus urging the gasket 4 into proper sealing position. In such instances, the diaphragm will be normally flexed in the direction of the support.

The gasket support 5 preferably takes the form of a clip which may be snapped into position in engagement with the skirt 8, and, in the embodiment shown in Figure 1, includes a base 12 inclined upwardly from its opposite ends towards the concavity 11, the duo-inclined base permitting slight flexure of the support to effect unsealing of the vent orifice and facilitating assembly of the support with the closure. The base 12 is flanged upwardly and outwardly at 13 and 14 and crook-shaped lips 15 and 16 are formed in the support to frictionally engage the closure at the U shaped portion defined by the skirt 8. Horizontally extending surfaces 17 and 18 of the lips lie in engagement with the under side of the diaphragm 2 and serve to position the support with respect to the diaphragm. With this structure, it is possible to predetermine the position of the support with respect to the diaphragm within relatively narrow limits and, in this respect, my closure is an innovation since it is the first to provide a diaphragm valve action in which it is possible to pre-establish the amount of pressure required to effect venting action. The degree of vacuum which may be created in a container sealed with this closure by the usual heat method is greater than that obtainable with prior art structures mainly because it is possible to position the valve support with respect to the diaphragm in such manner that the diaphragm, in its normally sealed position, exerts relatively little pressure against the valve gasket carried by the support and venting at low pressure will occur reducing the pressure within the container end, upon cooling effecting a high degree of vacuum. It is obvious that if high internal pressure is required to effect venting, there will always be a considerable amount of air or gas within the receptacle which will reduce the degree of vacuum created upon cooling of the container and contents. In the prior art structures, it has always been necessary to have the sealing action on the positive or high pressure side in order to obviate the possibility of "leakers" which would result if the closures were not uniformly positioned on the receptacles to be sealed.

In the assembly of the various elements, the gasket 4 is positioned so as to lie in engagement with the diaphragm about the eyelet 6, the support 5 is positioned thereover and force is applied thereto in the area of the flanges 13 and 14 causing the support to spread lengthwise until the lips 15 and 16 snap into engagement with the skirt 8. A sealing ring 19 is then positioned within the recess defined by the flange 7, and is adapted to seal against the lip of receptacle 20 to which the closure is applied, being held in position by a screw threaded ring 21 engaging thread formations provided on the receptacle neck.

In order to create a vacuum within the recepticle after the closure is positioned thereon in final sealing position, utilizing the heat method, the container and contents are heated by water or steam bath, or are placed in an oven or other heating chamber thus causing the development of gaseous pressure within the container forcing the diaphragm to move upwardly away from the support and the gasket, thus unsealing the vent orifice and permitting the escape of the gas. As soon as the pressure is relieved, as by cooling of the contents of the receptacle, the diaphragm returns to its sealed position and as cooling continues a vacuum is created within the container, the ambient atmosphere acting upon the diaphragm urging it firmly into engagement with the valve gasket.

In order to break the vacuum within the receptacle it is only necessary to insert a tool through the opening 3 and into engagement with the concavity 11, thus urging the support away from the diaphragm 2 and moving the edge 9 away from the under side of the diaphragm, permitting air to enter the receptacle and thus equalize the pressure within the receptacle with that of the ambient atmosphere. Removal of the closure is then simple and the closure is not mutilated or rendered unfit for further use.

The embodiment of my invention illustrated in Figure 2 is generically the same as that previously described and corresponding identifying numerals are applied to similar elements. The closure of Figure 1 and the closure of Figure 2 differ in the provision of an integral attaching skirt 22 in the embodiment of Figure 2 and in the provision of a flat plane portion in the gasket support 23 in place of the concavity 11 of Figure 1. The fin edge 24 of the valve gasket sealingly engages the flat surface of the support 23.

The closure of Figure 2 possesses all of the characterizing features of the present invention, including the channel-shaped diaphragm support which limits straining stresses incident to the application of the closure to a receptacle to portions disposed exteriorly of the diaphragm, so that the diaphragm action may be delicately controlled; the unitary construction with frictional engagement of all the parts; positive vent sealing action at low pressure with a normally sealing diaphragm and a resilient gasket support so arranged with respect to the other elements as to be movable downwardly to unseal the vent orifice. In addition, the entire closure is unitary, whereas in the embodiment previously described, the screw threaded ring 21 is a separate element from the valve assemblage.

Figure 3 illustrates my invention applied to a metal container. The container body 25 has a top portion 26 of usual construction seamed thereto, the top being provided with a central opening defined by a downwardly extending circular flange 27, adapted to receive a valve assemblage. The valve assemblage is substantially the same as those referred to above and consists of four elements, all of which are frictionally joined to facilitate handling and usage. The diaphragm 28 has an angularly disposed support 29, similar to the skirt 8 of Figure 1, integral with the diaphragm and a cylindrical wall 30 extends upwardly from the support 29 and is provided with a radially extending flange 31 defining a recess to accommodate a rubber sealing ring 32 which lies against the top 26 of the can and the under side of the flange 31. The ring is preferably frictionally held in engagement with the valve assemblage so that it moves therewith. As in Figure 2, all of the generic characterizing features of the present invention are embodied in the closure of Figure 3 and like reference numerals have been applied to indicate corresponding parts. The differences are those necessitated in providing the assemblage for use with a metal container rather than with a glass jar or bottle.

The heads of large metal containers must, of necessity, be formed of relatively heavy metal in order to withstand the pressure of the contents thereagainst and also to permit handling without objectionable deformation. Metal of this gauge is not suitable for the formation of diaphragms if fineness of control is to be a factor. Thus, it is not possible with such containers to form the diaphragm as an integral part of the head. On smaller size containers this may be conveniently possible. The insertable assemblage illustrated in Figure 3 is eminently suited for use in large size containers, since by means of it a highly flexible, finely controllable disphragm may be obtained and proper vacuumization readily effected. When it is considered that the metal commonly employed in the heads of cans of one gallon capacity is generally of heavy gauge, the advantages of the present assemblage with a sensitive diaphragm are obvious.

It will be noted that in all of the embodiments, the gasket support is positioned a predetermined distance from the diaphragm and is constructed and arranged as to be capable of limited flexure downwardly away from the diaphragm to permit unsealing of the vent orifice. The metal from which the support is formed is preferably considerably stiffer than that of the diaphragm in order that it will maintain its position when the diaphragm is by atmospheric pressure urged against the valve gasket and the force is transmitted through the gasket to the support, for otherwise, the support would be sprung downwardly, thus militating against a perfect sealing action.

The characterizing features of my present invention, particularly as they relate to the closure of my prior Patent No. 1,576,763, have been recited above, as well as certain illustrative advantages of the present closure over those contemplated by the prior art. The advance created by this invention is not limited to those improvements specifically recited, for others are obvious from the description and drawing and will be immediately grasped by those skilled in this field of endeavor.

While I have illustrated and described certain preferred embodiments of my invention, it will be understood that the same may be embodied and practiced in various forms within the scope of the following claims.

I claim:

1. A closure for sealing jars and other receptacles comprising a flexible diaphragm having a vent orifice, a support for said diaphragm comprising a channel-shaped annular portion formed integrally with the diaphragm and circumscribing it, a gasket for sealing the vent orifice, and a support for said gasket fixed relatively to said diaphragm in such position that the orifice is sealed when the diaphragm is flexed in one direction, said gasket support comprising a substantially U-shaped clip frictionally joined to and in snap engagement with said annular diaphragm support and holding the gasket in predetermined position relative to the vent orifice of the diaphragm when the diaphragm is in its normal position, said support being yieldable in an amount sufficient to permit unsealing of the vent orifice by slight movement of the gasket support away from the diaphragm upon the application of manual force to the gasket support.

2. A valved closure for sealing jars and the like including a top portion and a skirt, the skirt having means for engagement with complementary engaging means on the exterior of the neck of the jar to be sealed, said top portion comprising a flexible circular diaphragm having a vent orifice therein and an annular channel-shaped portion formed integrally with the diaphragm and the skirt, said channel-shaped portion forming a liner receiving annular recess and providing a rigid circular flange, means for normally sealing the orifice in said diaphragm including a gasket and a support for the gasket in the form of a substantially U-shaped clip frictionally held to and in snap engagement with said flange and holding the gasket in predetermined position relative to the vent orifice of the diaphragm when the diaphragm is in its normal position, said support being yieldable in an amount sufficient to permit unsealing of the vent orifice in the diaphragm by slight movement of the gasket support away from the diaphragm upon the application of manual force.

3. A valved closure in accordance with claim 1 in which the gasket support is in the form of a substantially U-shaped clip having lips engageable with diametrically opposed portions of the annular channel-shaped diaphragm support and has substantially flat surfaces lying in engagement with the under side of the diaphragm which serve to position the gasket support in predetermined position with respect to the vent orifice of the diaphragm when the diaphragm is in its normal position.

4. A valved closure in accordance with claim 1 in which the diaphragm, diaphragm support, valve gasket and gasket support are unitary and in which there is provided a separate screw threaded ring adapted to hold said unitary valve assemblage in position on the closure to be sealed.

HARRY INGRAM.